(12) United States Patent
Chin et al.

(10) Patent No.: US 11,632,793 B2
(45) Date of Patent: Apr. 18, 2023

(54) METHOD AND APPARATUS FOR RANDOM ACCESS PROCEDURE

(71) Applicant: FG Innovation Company Limited, Tuen Mun (HK)

(72) Inventors: Heng-Li Chin, Taipei (TW); Chia-Hung Wei, Taipei (TW); Hung-Chen Chen, Taipei (TW); Mei-Ju Shih, Taipei (TW); Chie-Ming Chou, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 48 days.

(21) Appl. No.: 17/393,378

(22) Filed: Aug. 3, 2021

(65) Prior Publication Data

US 2021/0368540 A1 Nov. 25, 2021

Related U.S. Application Data

(63) Continuation of application No. 16/280,492, filed on Feb. 20, 2019, now Pat. No. 11,153,904.
(Continued)

(51) Int. Cl.
*H04W 74/02* (2009.01)
*H04W 74/08* (2009.01)
(Continued)

(52) U.S. Cl.
CPC ......... *H04W 74/02* (2013.01); *H04W 56/001* (2013.01); *H04W 74/0833* (2013.01); *H04W 76/27* (2018.02); *H04W 80/02* (2013.01)

(58) Field of Classification Search
CPC ..... H04W 52/02; H04W 56/001–0025; H04W 72/02; H04W 74/006;
(Continued)

(56) References Cited

U.S. PATENT DOCUMENTS

| 8,432,811 B2* | 4/2013 | Park ................. H04W 56/0005 370/252 |
| 2011/0216706 A1* | 9/2011 | Lee ................. H04W 74/0833 370/328 |

(Continued)

FOREIGN PATENT DOCUMENTS

| CN | 101990311 A | 3/2011 |
| CN | 102014516 A | 4/2011 |

(Continued)

OTHER PUBLICATIONS

Mao Haijun, Guangdong Communication Technology No. 09, "Optimization of random access precursor schemes for fourth-generation mobile communications", (Sep. 15, 2016), See the Abstract.

*Primary Examiner* — Thomas R Cairns
(74) *Attorney, Agent, or Firm* — ScienBiziP, P.C.

(57) ABSTRACT

A method for a random access (RA) procedure performed by a user equipment (UE) having a specific access identity value is provided. The method comprises receiving a mapping table from a base station; transmitting a first RA preamble to the base station; receiving a random access response (RAR) including a backoff value; setting a resultant backoff value by multiplying the backoff value by a specific backoff multiplier corresponding to the specific access identity value in a case that the specific access identity value is included in the mapping table and an indication corresponding to the specific access identity value is not a specific value; setting the resultant backoff value to the backoff value in a case that the specific access identity value is not included in the mapping table; and transmitting a second RA preamble to the base station after a duration indicated by the resultant backoff value expires.

12 Claims, 13 Drawing Sheets

400

| Service Type | BI Multiplier |
|---|---|
| Access Category 1 | Multiplier 1 |
| Access Category 2 | Multiplier 2 |
| Access Category 3 | Infinity |
| ⋮ | ⋮ |
| Access Category X | Null |

Related U.S. Application Data

(60) Provisional application No. 62/633,133, filed on Feb. 21, 2018.

(51) Int. Cl.
*H04W 80/02* (2009.01)
*H04W 76/27* (2018.01)
*H04W 56/00* (2009.01)

(58) Field of Classification Search
CPC ... H04W 74/0833–0858; H04W 76/10; H04W 76/27; H04W 80/02
See application file for complete search history.

(56) References Cited

U.S. PATENT DOCUMENTS

2012/0077507 A1    3/2012  Lee
2013/0242730 A1    9/2013  Pelletier et al.

FOREIGN PATENT DOCUMENTS

| | | | |
|---|---|---|---|
| CN | 102573101 A | 7/2012 | |
| CN | 103228054 A | 7/2013 | |
| CN | 105873173 A | 8/2016 | |
| EP | 2441310 A1 | 4/2012 | |
| EP | 2670206 A1 | 12/2013 | |
| EP | 3125638 A1 * | 2/2017 | ........... H04B 7/0814 |
| WO | WO-2010016726 A2 * | 2/2010 | ........... H04L 1/1822 |
| WO | WO-2010064858 A2 * | 6/2010 | ........... H04L 5/0007 |

\* cited by examiner

| PRB Index / SSB Index | BI Value |
|---|---|
| PRB Index = 0 / SSB Index = 0 | $BI_{0,0}$ |
| PRB Index = 1 / SSB Index = 0 | $BI_{1,0}$ |
| ... | ... |
| PRB Index = X / SSB Index = 0 | $BI_{X,0}$ |
| PRB Index = 0 / SSB Index = 1 | $BI_{0,1}$ |
| ... | ... |
| PRB Index = X / SSB Index = Y | $BI_{X,Y}$ |

FIG. 3

| Service Type | BI Multiplier |
|---|---|
| Access Category 1 | Multiplier 1 |
| Access Category 2 | Multiplier 2 |
| Access Category 3 | Infinity |
| ... | ... |
| Access Category X | Null |

FIG. 4

| PRB Index / SSB Index | Power Ramping Step Value |
|---|---|
| PRB Index = 0 / SSB Index = 0 | $dB_{0,0}$ |
| PRB Index = 1 / SSB Index = 0 | $dB_{1,0}$ |
| ... | ... |
| PRB Index = X / SSB Index = 0 | $dB_{X,0}$ |
| PRB Index = 0 / SSB Index = 1 | $dB_{0,1}$ |
| ... | ... |
| PRB Index = X / SSB Index = Y | $dB_{X,Y}$ |

FIG. 7

| Service Type | Power Ramping Step Multiplier |
|---|---|
| Access Category 1 | Multiplier 1 |
| Access Category 2 | Multiplier 2 |
| Access Category 3 | Infinity |
| ... | ... |
| Access Category X | Null |

FIG. 8

METHOD AND APPARATUS FOR RANDOM ACCESS PROCEDURE

CROSS-REFERENCE TO RELATED APPLICATION(S)

The present application is a continuation application of U.S. patent application Ser. No. 16/280,492 filed on Feb. 20, 2019, which claims the benefit of and priority to provisional U.S. Patent Application Ser. No. 62/633,133 filed on Feb. 21, 2018, entitled "Prioritization of Random Access", with the contents of all of which are hereby incorporated fully by reference herein into the present application.

FIELD

The present disclosure generally relates to wireless communications, and more particularly, to random access (RA) procedure.

BACKGROUND

Wireless communication networks, such as a Universal Terrestrial Radio Access Network (UTRAN), or an Evolved-UTRAN (E-UTRAN), do not provide mechanisms for prioritizing grant of access to the network requested by different user equipments (UEs) (e.g., through different Random Access (RA) procedures) based on the service types requested by the UEs. Additionally, existing communication network systems fail to prioritize different services (e.g., Access Control (AC), Slice Identifier (ID), Quality of Service (QoS), etc.) provided by the network. A next generation wireless network (e.g., a 5$^{th}$ generation (5G) new radio (NR) network), however, is capable of handling a diverse variety of service requirements. Therefore, there is a need in the industry for prioritization of network access (e.g., by different UEs) and/or network services in 5G networks that may use existing radio communication network architecture (e.g., a Long Term Evolution (LTE) architecture).

SUMMARY

The present disclosure is directed to random access (RA) procedure.

In a first aspect of the present application, a method for a RA procedure performed by a user equipment (UE) having a specific access identity value is provided. The method includes receiving a mapping table via radio resource control (RRC) signaling from a base station, the mapping table including one or more access identity values and one or more backoff multipliers corresponding to the one or more access identity values; transmitting a first RA preamble of the RA procedure to the base station; receiving a random access response (RAR) in response to the first RA preamble from the base station, the RAR including a backoff value; setting a resultant backoff value by multiplying the backoff value by a specific backoff multiplier corresponding to the specific access identity value of the UE in a case that the specific access identity value of the UE is included in the mapping table and an indication corresponding to the specific access identity value of the UE is not a specific value; setting the resultant backoff value to the backoff value in a case that the specific access identity value of the UE is not included in the mapping table; and transmitting a second RA preamble of the RA procedure to the base station after a duration indicated by the resultant backoff value expires.

In a second aspect of the present application, a user equipment (UE) having a specific access identity value is provided. The UE includes one or more non-transitory computer-readable media having computer-executable instructions embodied thereon; and at least one processor coupled to the one or more non-transitory computer-readable media, and configured to execute the computer-executable instructions to: receive a mapping table via radio resource control (RRC) signaling from a base station, the mapping table including one or more access identity values and one or more backoff multipliers corresponding to the one or more access identity values; transmit a first RA (random access) preamble of the RA procedure to the base station; receive a random access response (RAR) in response to the first RA preamble from the base station, the RAR including a backoff value; set a resultant backoff value by multiplying the backoff value by a specific backoff multiplier corresponding to the specific access identity value of the UE in a case that the specific access identity value of the UE is included in the mapping table and an indication corresponding to the specific access identity value of the UE is not a specific value; set the resultant backoff value to the backoff value in a case that the specific access identity value of the UE is not included in the mapping table; and transmit a second RA preamble of the RA procedure to the base station after a duration indicated by the resultant backoff value expires.

In a third aspect of the present application, a method for a random access (RA) procedure performed by a base station is provided. The method includes transmitting a mapping table via radio resource control (RRC) signaling to a user equipment (UE) with a specific access identity value, the mapping table including one or more access identity values and one or more backoff multipliers corresponding to the one or more access identity values; receiving a first RA preamble of the RA procedure from the UE; transmitting a random access response (RAR) in response to the first RA preamble to the UE, the RAR including a backoff value; and receiving a second RA preamble of the RA procedure from the UE, wherein: a time interval between the first RA preamble and the second RA preamble is associated with a product of the backoff value and a specific backoff multiplier corresponding to the specific access identity value of the UE in a case that the specific access identity value of the UE is included in the mapping table and an indication corresponding to the specific access identity value of the UE is not a specific value, and the time interval between the first RA preamble and the second RA preamble is associated with the backoff value in a case that the specific access identity value of the UE is not included in the mapping table.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

FIG. 3 illustrates a data structure that defines the mapping between BI values and the corresponding SSB/PRB indices, according to an example implementation of the present application.

FIG. 4 illustrates a data structure that defines the mapping between BI multiplier values and the corresponding service types, according to an example implementation of the present application.

FIG. 7 illustrates a data structure that defines the mapping between the power ramping values and the corresponding SSB/PRB indices, according to an example implementation of the present application.

FIG. 8 illustrates a data structure that defines the mapping between the power ramping multiplier values and the corresponding service types, according to an example implementation of the present application.

DETAILED DESCRIPTION

Figure 1A:
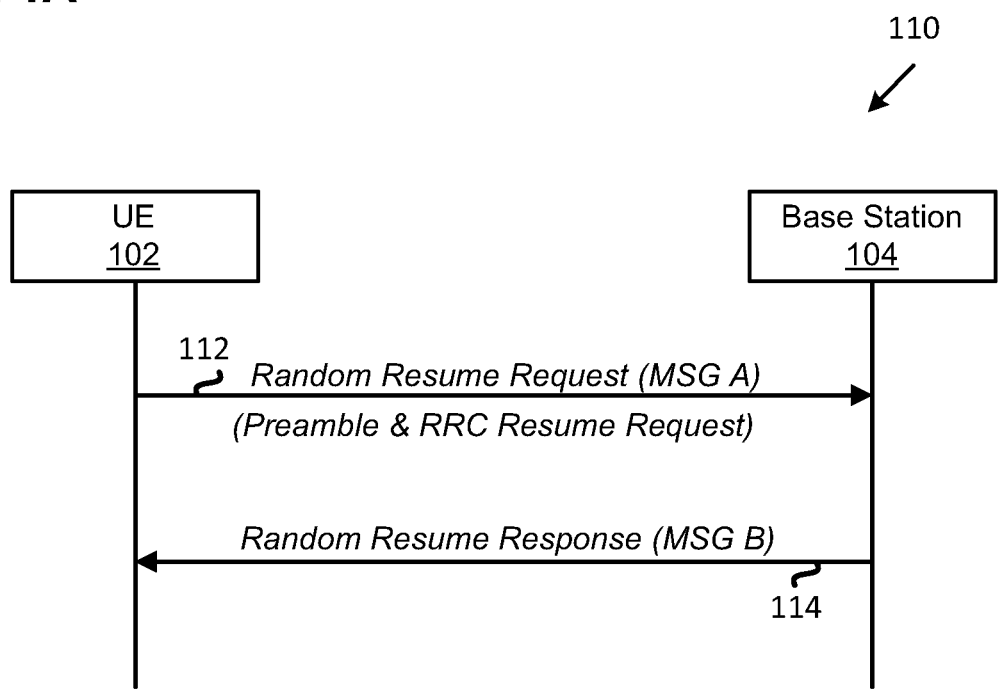
FIG. 1A is a diagram illustrating a 2-step random access procedure, according to an example implementation of the present application.

The following description contains specific information pertaining to exemplary embodiments in the present disclosure. The drawings in the present disclosure and their accompanying detailed description are directed to merely exemplary embodiments. However, the present disclosure is not limited to merely these exemplary embodiments. Other variations and embodiments of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation", "an implementation", "example implementation", "various implementations", "some implementations", "implementations of the present application", etc., may indicate that the implementation(s) of the present application so described may include a particular feature, structure, or characteristic, but not every possible implementation of the present application necessarily includes the particular feature, structure, or characteristic. Further, repeated use of the phrase "in one implementation", or "in an example implementation", "an implementation", do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising", when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

The term "and/or" herein is only an association relationship for describing associated objects, and represents that three relationships may exist, for example, A and/or B may represent that: A exists alone, A and B exist at the same time, and B exists alone. In addition, the character "/" used herein generally represents that the former and latter associated objects are in an "or" relationship.

Furthermore, combinations such as "at least one of A, B, or C", "at least one of A, B, and C", and "A, B, C, or any combination thereof" include any combination of A, B, and/or C, and may include multiples of A, multiples of B, or multiples of C. Specifically, combinations such as "at least one of A, B, or C", "at least one of A, B, and C", and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Persons skilled in the art will immediately recognize that any network function(s) or algorithm(s) described in the present disclosure may be implemented by hardware, software or a combination of software and hardware. Described functions may correspond to modules that may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, or an LTE-Advanced Pro system) typically includes at least one base station, at least one UE, and one or more optional network elements that provide connection towards a network. The UE communicates with the network (e.g., a CN, an evolved packet core (EPC) network, an Evolved Universal Terrestrial Radio Access network (E-UTRAN), a Next-Generation Core (NGC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a radio access network.

A base station may include, but is not limited to, a node B (NB) as in the Universal Mobile Telecommunication System (UMTS), an evolved node B (eNB) as in the LTE-A, a Radio Network Controller (RNC) as in the UNITS, a Base Station Controller (BSC) as in the Global System for Mobile communications (GSM)/GSM EDGE Radio Access Network (GERAN), an ng-eNB as in an E-UTRA base station in connection with the SGC, a next generation node B (gNB) as in the 5G Access Network (5G-AN), and any other apparatus capable of controlling radio communication and managing radio resources within a cell. The base station may connect to serve the one or more UEs through a radio interface to the network.

A base station may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UNITS (often referred to as 3G) based on basic Wideband-Code Division Multiple Access (W-CDMA), High-Speed Packet Access (HSPA), LTE, LTE-A, eLTE, NR (often referred to as 5G), and LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells. In MR-DC cases, the primary cell of an MCG or an SCG may be called as SpCell. PCell may refer to the SpCell of an MCG. PSCell may refer to the SpCell of an SCG. MCG means a group of serving cells associated with the MN, comprising of the SpCell and optionally one or more secondary cells (SCells). SCG means a group of serving cells associated with the SN, comprising of the SpCell and optionally one or more SCells.

As discussed above, the frame structure for NR is to support flexible configurations for accommodating various next generation (e.g., 5G) communication requirements, such as enhanced mobile broadband (eMBB), massive machine type communication (mMTC), ultra-reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services.

It's been envisaged that the next generation wireless communication networks will adopt the use of Synchronization Signal Blocks (SSBs) and Bandwidth Parts (BWPs). BWPs enable the UEs to operate in narrow bandwidth, and when a UE demands more data, the UE may inform the base station (e.g., a gNB) to enable a wider bandwidth. SSBs enable a gNB to transmit several different SSBs (e.g., via several different beams radiated in different directions) for multiple UEs located at various locations around the gNB. This way, the UEs are able to measure the signal strength of each SSB they detect for a certain period (e.g., a period of one SSB set) and from the measurement results, each UE is able to identify the SSB index with the strongest signal strength. As such, the different (configured) SSBs and BWPs in NR may be associated with different Random Access Channel (RACH) configurations (and RACH preambles). Therefore, some of the present embodiments may utilize the properties of SSB and BWP (e.g., during an RA procedure) to prioritize the UEs' access to the network (e.g., by granting shorter RACH times to UEs with higher priority levels), and to the different network services.

Moreover, the value of the Backoff Indicators (BIs) that are associated with different SSBs or BWPs may be different (e.g., in order to manage SSB congestion). The BI may be included in a Random Access Response (RAR) MAC subheader that carries a parameter/value indicating the time delay (or delay intervals) between a Physical RACH (PRACH) and the next PRACH (e.g., sent to a base station, or a cell associated with a base station). Based on the value received in the backoff indicator subheader field, a UE may calculate a backoff time (e.g., in some embodiments, the UE may randomize a backoff time following a uniform distribution between 0 and a backoff value obtained from the received BI value via a preconfigured lookup table) during which the UE may be prohibited from transmitting RA preambles to the base station (e.g., an eNB or a gNB).

Some examples of when a UE may calculate the backoff time (using the BI value) may include when the UE does not receive the RAR containing Random Access Preamble identifiers that match the PREAMBLE_INDEX transmitted by the UE during the configured ra-Response Window; when the UE does not receive a physical downlink control channel (PDCCH) addressed to TEMPORARY_C-RNTI which indicates a MAC Protocol Data Unit (PDU) containing a UE Contention Resolution Identity that matches the Common Control Channel (CCCH) Service Data Unit (SDU) transmitted in Msg 3; and when the UE does not receive a PDCCH addressed to C-RNTI during the configured ra-ContentionResolutionTimer if a C-RNTI MAC CE was included in Msg 3.

In some of the present embodiments, a UE may continue looking for new contention-free RA preambles (e.g., specified in one or more SSB candidates), that are configured by the base station, during the time the UE is in the backoff mode (e.g., during the time that the UE is prohibited from sending the next RACH preamble). In some aspects of the present embodiments, the base station may configure one or more contention-free RA (CFRA) preambles, each of which may correspond to a high priority SSB candidate, through RRC signaling (e.g., via a RACH-ConfigDedicated parameter) to the UEs. A UE, while in the backoff mode, may select from one of the configured CFRA preambles that corresponds to a detected high priority SSB candidate, and transmit the selected CFRA preamble immediately to the base station, if the UE needs to establish a connection (and synchronize) with the base station.

In other words, even though the UE may have received a BI from the base station after a PRACH transmission, and while the UE is in a backoff mode (i.e., waiting for the backoff time to expire) before transmitting the next preamble, the UE of some of the present embodiments may ignore the backoff time and transmit a selected CFRA preamble that corresponds to a detected high priority SSB candidate. On the other hand, if no CFRA preamble is configured, or if no high priority SSB candidate to which the configured CFRA preamble corresponds is detected, the UE of some of the present embodiments may, upon the expiration of the backoff time (e.g., expiration of the time intervals calculated based on the BI value), send a configured contention-based RA (CBRA) preamble which corresponds to a low priority SSB candidate. Hereinafter, and in describing the figures, any detected SSB candidate that is associated with a configured CFRA preamble is a high priority SSB candidate (even if the SSB candidate is not called a high priority SSB candidate), and any SSB candidate that is associated with a CBRA preamble is a low priority SSB candidate (even if the SSB candidate is not called a low priority SSB candidate).

In some aspects of the present embodiments, if the UE determines that at least one high priority SSB candidate (configured by the base station) is available (e.g., the signal strength of the SSB candidate is stronger than a predefined threshold), the UE may select the configured CFRA preamble corresponding to the available high priority SSB candidate and transmit the selected CFRA preamble (e.g., a new PRACH preamble) to the base station immediately (i.e., before the backoff time expires). That is, when at least one CFRA preamble corresponding to a high priority SSB candidate is configured, the UE may further determine whether at least one of those high priority SSB candidates is available. If so, the UE of some of the present embodiments may ignore the prohibition for the next PRACH transmission (specified by the BI) and may immediately initiate a new PRACH transmission procedure using the CFRA preamble which corresponds to the available high priority SSB candidate. On the other hand, if no CFRA preamble is configured, or if no high priority SSB candidate which the configured CFRA preamble corresponds to is available, the UE of some of the present embodiments may, upon the expiration of the backoff time (e.g., expiration of the time intervals calculated based on the BI value), send a configured contention-based RA (CBRA) preamble which corresponds to a low priority SSB candidate.

In some aspects of the present embodiments, as described in more detail below, the base station may prioritize the SSB candidates (e.g., as high priority SSB candidates and low priority SSB candidates) using the BI values or power ramping step values associated with the SSB candidates. In some aspects of the present embodiments, instead of, or in addition to, prioritizing the SSB candidates, the base station may prioritize different network services (e.g., access category, access class, event that triggers RA, slice ID, QoS, etc.) using the BI multipliers or the power ramping step multipliers.

FIG. 1A is a diagram illustrating a 2-step random access procedure, according to an example implementation of the present application. Diagram 110 includes UE 102 and base station 104 (e.g., an eNB or a gNB) where UE 102 may transmit uplink (UL)data to base station 104 using a 2-step random access procedure.

As illustrated in FIG. 1A, action 112 includes UE 102 transmitting a random access channel (RACH) preamble (e.g., MSG A) to base station 104. Base station 104 configures random access channel (RACH) resources which are used to let UE 102 transmit the RACH preamble, uplink (UL) data, and the UE ID of UE 102. UE 102 may randomly select a RACH preamble resource to be actually used from the RACH preamble resources (e.g., prescribed by combinations of time resources, frequency resources, and sequence resources). Then, UE 102 may transmit the RACH preamble using the selected RACH preamble resource. The UL data along with the UE ID of UE 102 may also be multiplexed with the RACH preamble in the MSG A.

As illustrated in FIG. 1A, action 114 includes base station 104 transmitting a random access response (RAR) (e.g., MS GB) to UE 102, when base station 104 detects the RACH preamble and the UL data along with the UE ID of UE 102. For UL data transmission, base station 104 may provide an acknowledge (ACK)/non-acknowledgement (NACK) message in MSG B to indicate whether base station 104 has received the UL data in MSG A successfully.

Figure 1B:
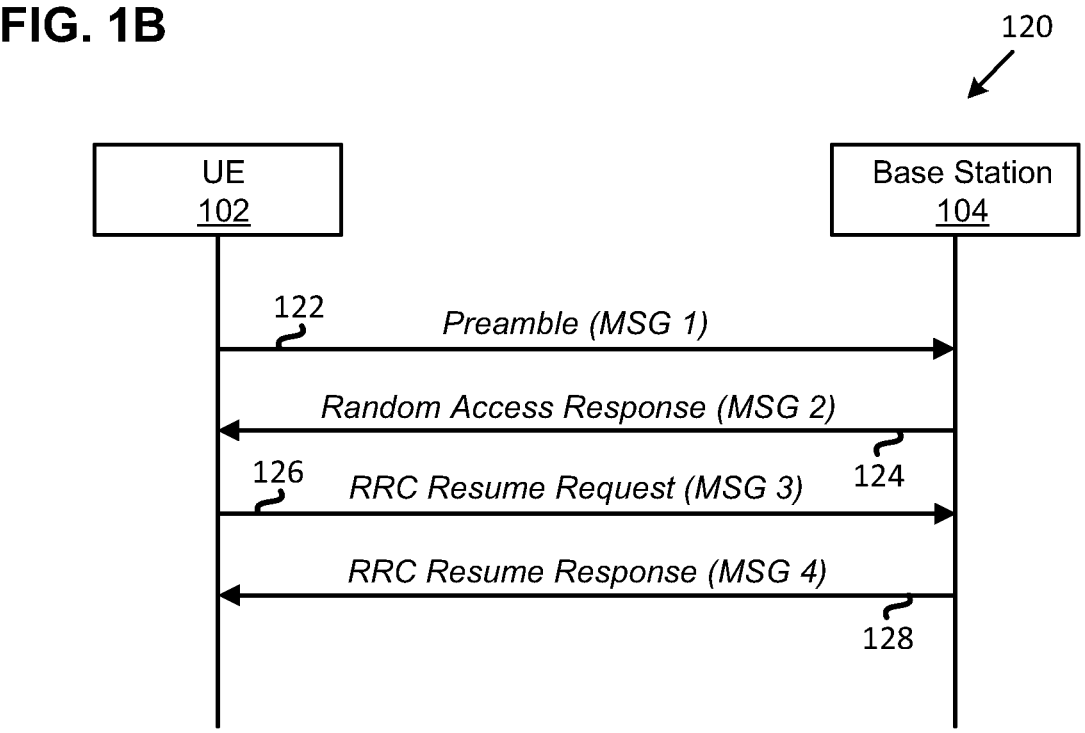
FIG. 1B is a diagram illustrating a 4-step random access procedure, according to an example implementation of the present application.

FIG. 1B is a diagram illustrating a 4-step random access procedure, according to an example implementation of the present application. Diagram 120 includes UE 102 and base station 104 (e.g., an eNB or a gNB), where UE 102 may transmit UL data to base station 104 using a 4-step random access procedure. As illustrated in FIG. 1B, action 122 includes UE 102 transmitting a random access channel (RACH) preamble (e.g., MSG 1) to base station 104. In the present implementation, UE 102 may randomly select a RACH preamble resource to be actually used from a group of RACH preamble resource candidates (prescribed by combinations of time resources, frequency resources and sequence resources). Then, UE 102 may transmit the RACH preamble using the selected RACH preamble resource.

Action 124 includes base station 104 transmitting a random access response (RAR) (e.g., MSG 2) to UE 102, when base station 104 detects the RACH preamble. The RAR is transmitted over the entire cell covered by base station 104, since base station 104 may not have been able to identify UE 102 that transmitted the RACH preamble. For example, a physical downlink shared channel (PDSCH) resource in which the RAR is mapped may be indicated by base station 104 to UE 102 via a physical downlink control channel (PDCCH). Also, the RAR may contain information relating to a resource to be used by UE 102 in uplink or information relating to uplink transmission timing for UE 102.

Action 126 includes UE 102 transmitting an RRC connection request or a scheduling request (e.g., MSG 3) using the uplink resource specified by base station 104 via the RAR in action 124. In the present implementation, UE 102 may transmit a Resume Request message to base station 104, where the Resume Request message may not be requesting for transitioning to RRC_CONNECTED state. Instead, the Resume Request message in MSG 3 may be used for transmitting uplink (UL) data.

Action 128 includes base station 104 transmitting an RRC connection response or a scheduling response (e.g., MSG 4) to UE 102, when base station 104 detects the RRC connection request or the scheduling request. In the present implementation, base station 104 may transmit a Resume Response message to UE 102, where the Resume Response message may not be for resuming, but containing corresponding acknowledgement of the UL data sent in MSG 3 in action 126.

Figure 2A:
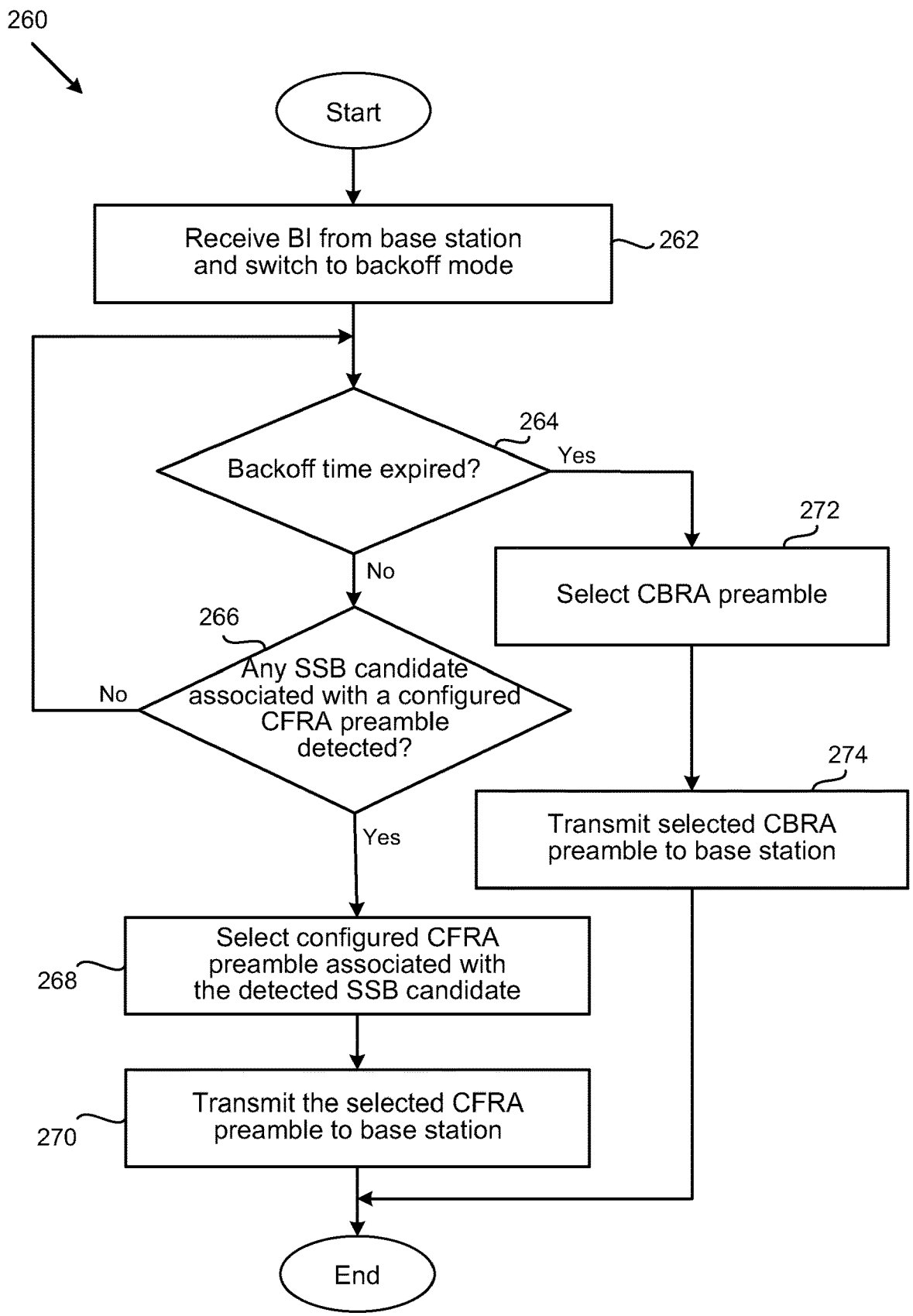
FIG. 2A is a flowchart illustrating a method performed by a UE for transmitting a PRACH preamble, while the UE is in the backoff mode, according to an example implementation of the present application.

FIG. 2A is a flowchart illustrating a method (or process) 260 performed by a UE for transmitting an RA preamble, while the UE is in the backoff mode, according to an example implementation of the present application. As shown in FIG. 2A, in some of the present embodiments, the process 260 may receive (in action 262) a backoff indicator from a base station and switch to the backoff mode. As discussed above, when a UE fails to establish a connection (e.g., (re)establishing a radio link or synchronize) with a base station (e.g., when the base station is overwhelmed with connection setup requests sent by other UEs), the base station may inform the UE (e.g., through an RAR message) that the UE should make another attempt (e.g., to send a new RA preamble) at a later time(s). As discussed above, the prohibiting time (or the backoff time) before the UE makes another connection setup attempt is calculated based on the BI value in the RAR message.

In action 264, after receiving the RAR message, the process 260 may determine whether the backoff time has expired or not. In other words, the UE may determine whether the backoff time indicated by the base station has expired, or the UE should still wait for its turn to make a new attempt to establish a connection with the base station. When the process determines that the backoff time has not expired, the process 260 may determine, in action 266, whether any (high priority) SSB candidate associated with a configured CFRA preamble is detected. As discussed above, one or more CFRA preambles may have been configured to the UE by the base station (e.g., before the backoff time). That is, the UE of some of the present embodiments may continue looking for high priority SSB candidates that correspond to the CFRA preambles configured by the base station even though the backoff time has not expired.

When the process 260 determines that no SSB candidate corresponding to a configured CFRA preamble is detected, or no CFRA preamble is configured to the UE, the process may loop back to action 264 to determine whether the backoff time has expired. Alternatively, if the process 260 determines that at least one SSB candidate which corresponds to a configured CFRA preamble is detected, the process may select, in action 268, the CFRA preamble that corresponds to the detected SSB candidate. In some of the present embodiments, the process 260 may then transmit, in action 270, the selected CFRA preamble that corresponds to the detected SSB candidate to the base station. That is, as soon as at least one SSB candidate which corresponds to the configured CFRA preamble is detected (by the UE), the process 260 of some embodiments may send a CFRA preamble that corresponds to the detected SSB candidate to the base station immediately even if the backoff time has not expired yet. After transmitting the selected preamble, the process 260 may end.

Conversely, when the process 260 determines, in action 264, that the backoff time has expired (and no CFRA preamble is configured or no SSB candidate corresponding to a configured CFRA preamble is detected), the process 260 of some of the present embodiments may select, in action 272, a configured (low priority) CBRA preamble. In some of the present embodiments, the process 260 may then transmit, in action 274, the selected CBRA preamble to the base station. The process 260 may then end.

The specific operations (or actions) of the process 260 may not be performed in the exact order shown and described above. Additionally, the specific operations may not be performed in one continuous series of operations, and different specific operations may be performed in different embodiments. For instance, in some aspects of the present embodiments, as described in more detail below with reference to FIG. 2B, before transmitting a selected CFRA preamble that corresponds to a detected SSB candidate to the base station (e.g., before the action 270), a UE may determine whether the detected SSB candidate corresponding to the configured CFRA preamble meets the specific criteria (or set of attributes). Furthermore, the process 260 may be implemented in some other embodiments using several sub-processes, or as part of a larger macro process.

Figure 2B:
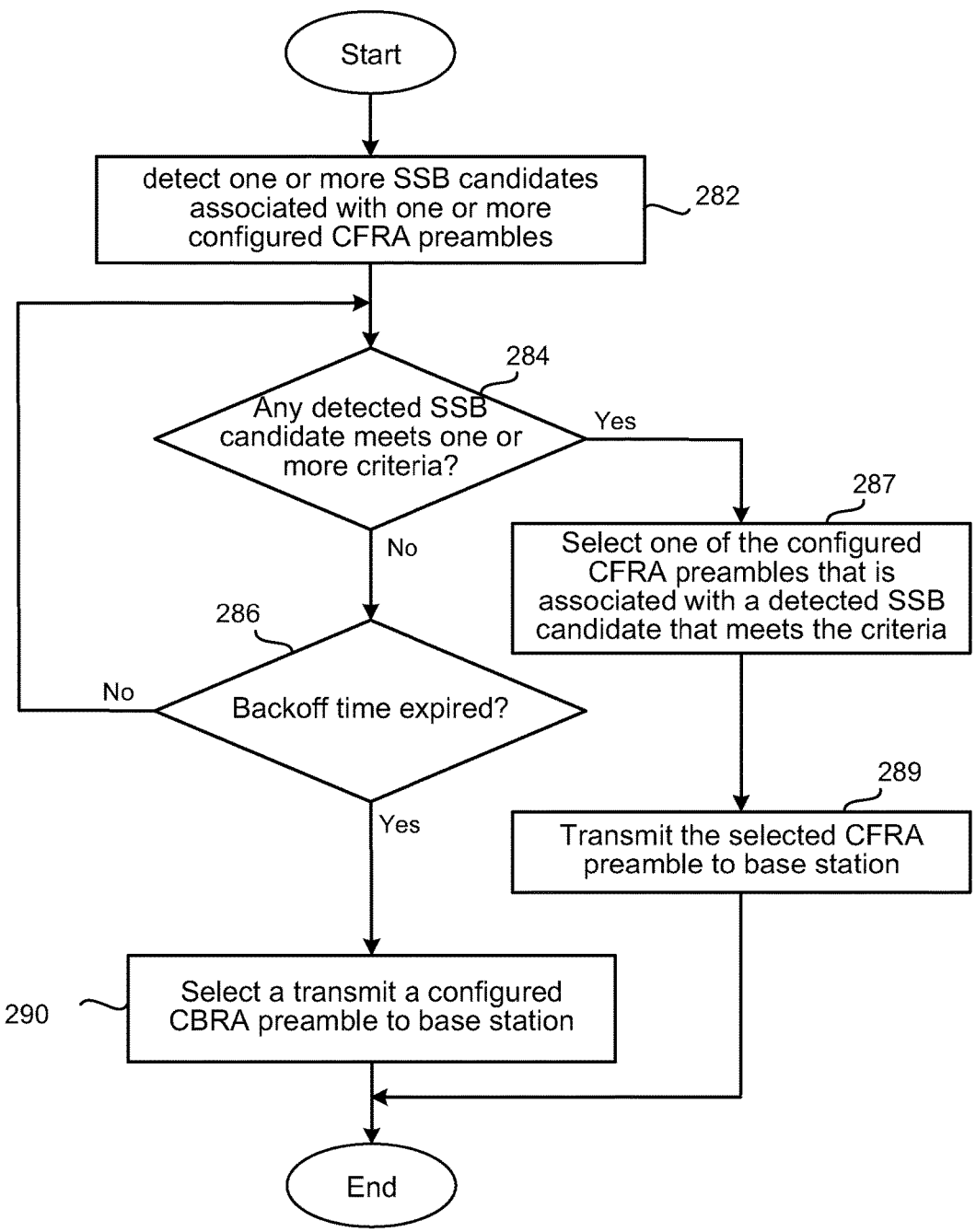
FIG. 2B is a flowchart illustrating a method performed by a UE for transmitting a PRACH preamble, while the UE is in the backoff mode, according to another example implementation of the present application.

FIG. 2B is a flowchart illustrating a method (or process) 280 performed by a UE for transmitting an RA preamble, during the backoff time, according to another example implementation of the present application. The method may start, in action 282, by detecting one or more SSB candidates that correspond to one or more configured CFRA preambles while the UE is in a backoff mode. The process 280 may then determine (in action 284) if any of the detected SSB candidates meet one or more criteria (or set of attributes) before transmitting the configured CFRA preamble that corresponds to the detected SSB candidate. That is, in some embodiments, even if at least one SSB candidate which corresponds to a CFRA preamble has been detected, the UE may not send the corresponding CFRA preamble to the base station if the UE determines that the detected SSB candidate corresponding to the configured CFRA preamble does not meet the required criteria (e.g., previously defined in the UE's configuration, or defined by the base station). In some of the present embodiments, the one or more criteria may include, but are not limited to, a synchronization signal reference signal received power (SS-RSRP) being above a predetermined threshold, a channel state information-reference signal received power (CSI-RSRP) being above a predetermined threshold (e.g., when the configured CFRA preamble is associated with a CSI-RS), etc.

When the process 280 determines that one or more detected SSB candidates (that correspond one or more configured CFRA preambles) meet the required criteria, the process may select, in action 287, one of the configured CFRA preambles that corresponds to a detected SSB candidate that meets the required criteria. The process 280 may then, in action 289, transmit the selected CFRA preamble to the base station. The process may then end. As shown in FIG. 2B, the process 280 of some of the present embodiments may send the selected CFRA preamble that corresponds to the detected SSB candidate which meets the required criteria immediately, regardless of the expiration of the backoff time. That is, the UE may transmit the selected CFRA preamble, even if the backoff time (calculated from the BI value) has not expired yet.

Conversely, if the process 280 determines that the detected SSB candidate which corresponds to a configured CFRA preamble does not meet the required criteria, the process may determine, in action 286, whether the backoff time has expired. When the process determines that the backoff time has not expired, the process 280 may loop back to action 284 to select another SSB candidate (that corresponds to a configured CFRA preamble). Alternatively, if the process 280 determines, in action 286, that the backoff period has expired (and no SSB candidate that meets the criteria is detected), the process may select, in action 290, a configured CBRA preamble and transmit the selected CBRA preamble to the base station. That is, in some aspects of the present embodiments, when no CFRA preamble has been configured, or when none of the SSB candidates that corresponds to the configured CFRA preamble meets the required criteria, the UE may select a CBRA preamble configured by the base station. The UE may then transmit the selected CBRA preamble to the base station after the backoff time (calculated from the BI) expires.

The specific operations (or actions) of the process 280 may not be performed in the exact order shown and described above. Additionally, the specific operations may not be performed in one continuous series of operations, and different specific operations may be performed in different embodiments. Furthermore, the process 280 may be implemented in some other embodiments using several sub-processes, or as part of a larger macro process.

Figure 2C:
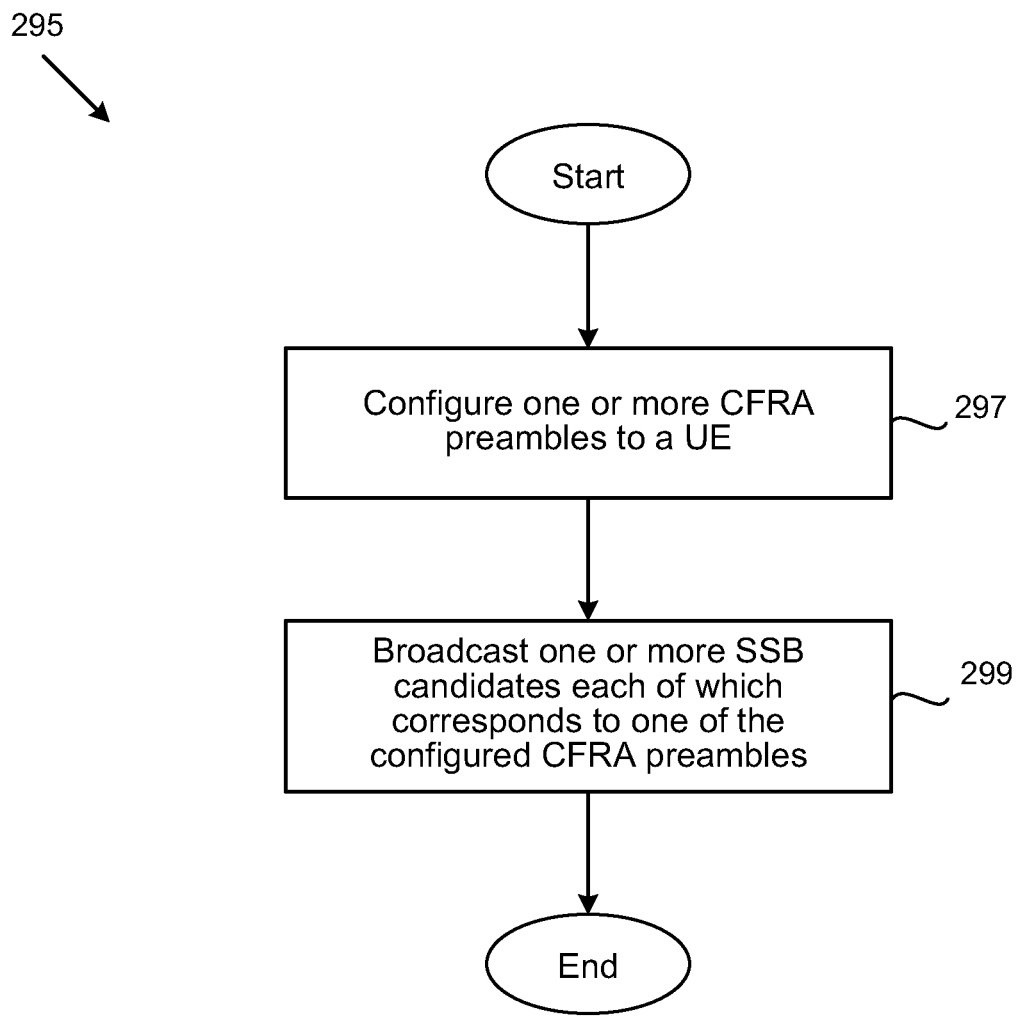
FIG. 2C is a flowchart illustrating a method performed by a base station for transmitting one or more contention-free resources, according to an example implementation of the present application.

FIG. 2C is a flowchart illustrating a method (or process) 295 performed by a base station for configuring one or more CFRA preambles to a UE, according to an example implementation of the present application. The process 295 may start at action 297 by configuring one or more CFRA preambles, each of which corresponds to a synchronization signal block (SSB), to a UE. As described above, in some of the present embodiments, a base station may configure the CFRA preambles to the UE via RRC signaling. In some of the present embodiments, the base station configures the UE with the CFRA preambles so that the UE selects one of the CFRA preambles for transmission during the backoff time, as described above and below.

In action 299, the process 295 may broadcast the SSB candidates that correspond to the configured CFRA preambles. As described above, during the backoff time, a UE may select one of the configured CFRA preambles that corresponds to a detected SSB candidate and transmit the selected CFRA preamble to the base station (without waiting until the expiration of the backoff time). In some aspects of the present embodiments, the UE may select one of the configured CFRA preambles that corresponds to a detected SSB candidate and transmit the selected CFRA preamble if the detected SSB candidate corresponding to the configured CFRA preamble meets specific criteria (e.g., if the measured RSRP value of the corresponding detected SSB candidate is above a configured SSB threshold). The process may then end.

As described above, the different (configured) SSBs and BWPs in NR may be associated with different Random Access Channel (RACH) configurations (and RACH preambles). Therefore, some of the present embodiments may utilize the properties of the SSBs and the BWPs (e.g., during an RA procedure) to prioritize the UEs' access to the network (e.g., by granting shorter BI values to the UEs with higher priority levels), and to the different network services (e.g., access category, access class, event that triggers RA, slice ID, QoS, etc.). In some of the present embodiments, the UEs may evaluate such prioritizations using the values indicated by the BIs, BI multipliers, power ramping steps, power ramping multipliers.

In some of the present embodiments, the base station may define different priorities for different services (accessed by the UE) using one or more data structures configured for the UEs (e.g., through a MAC subheader or RRC signaling, such as an RACH-ConfigCommon Information Element (IE) or an RACH-ConfigDedicated IE) in combination with the values of the BIs transmitted to the UEs (e.g., when the UEs are in a backoff mode). In some of the present embodiments, based on the received information (e.g., in the data structure(s)) the UEs may determine whether to override the BI specified in the RAR.

For example, in some of the present embodiments, upon reception of the data structure(s) (e.g., one or more tables included in an RACH-ConfigCommon IE), a UE may identify the BI value that corresponds to the SSB candidate that the UE selects (or the UE is required to switch to). In some such embodiments, if a BI value of null is indicated for the SSB index that the UE selects, the UE may apply the BI indicated in the RAR. Alternatively, if the BI value is anything other than null, the UE may ignore the BI value included in the RAR and use the priority specified for the selected SSB candidate.

In some of the present embodiments, the UEs may switch between BWPs and SSBs during the RA procedures. Therefore, mapping between specific BIs and SSBs/BWPs may be provided to the UEs (e.g., by the base station), such that the UEs may be able to apply the specific BI values based on the SSBs/BWPs to which the UEs are requested (e.g., by the base stations) to switch. FIGS. 3 and 4 illustrate such data structures.

FIG. 3 illustrates a data structure (e.g., table 300) that defines the mapping between the BI values 310 and the corresponding SSB/PRB indices 320, according to an example implementation of the present application. In some of the present embodiments, the base station may transmit the table 300 to the UEs using an RRC signaling (e.g., a RACH-ConfigCommon IE). Upon reception of the table 300, the UE may identify the BI value that corresponds to the PRB index and SSB index that the UE selects. In an example embodiment, if a BI value of "null" is associated with the PRB index/SSB index that the UE selects, the UE may apply the BI indicated in the RAR. On the other hand, if the BI value is not "null", in some of the present embodiments, the UE may ignore the BI value specified in the RAR and apply the BI value based on table 300. In the illustrated example of FIG. 3, if the UE selects an SSB candidate that is associated with the PRB Index/SSB Index 340, the UE may apply the BI 330 (i.e., $BI_{0,1}$).

It should be noted that the base station, in some of the present embodiments, may use the PRB index (instead of the BWP index) for prioritizing the BIs because during an initial access (e.g., the UE is not in a connected state), the UE still does not have the BWP configuration information (e.g., the BWP ID). Therefore, the PRB index may be used to implicitly indicate the different BI values that a UE may apply in different frequency domain locations.

It should also be noted that, in some of the present embodiments, not every PRB may need to be associated with a BI value. In some aspects of the present embodiments, the base station (e.g., a gNB) may only provide (e.g., through a table, such as the table 300) the mapping between the BI values and the PRBs that have valid PRACH resources. For example, in some embodiments, if the PRACH is allocated in PRB#1 and PRB#5 on SSB #1, the base station may only provide the BI values $BI_{1,1}$ and $BI_{5,1}$.

In some aspects of the present embodiments, a UE may use the table 300 illustrated in FIG. 3, in conjunction with another mapping table illustrated in FIG. 4 to prioritize the different network services. FIG. 4 illustrates a data structure (e.g., mapping table 400) that defines the mapping between the BI multiplier values 420 and the corresponding service types 410, according to an example implementation of the present application. In some of the present embodiments, after obtaining the table 300 with reference to FIG. 3, the UE may use the table 400 to realize the priorities of the different services (e.g., Access Category, event that triggers RA, slice ID, QoS, etc.).

In some of the present embodiments, the base station may use an RRC signaling (e.g., the RACH-ConfigCommon IE) to transmit the table 400 to the UEs. After acquiring the table 400, the UE, in some of the present embodiments, may multiply the BI multiplier 420 by the BI value 310 obtained from the table 300, to determine the prioritized BI value for the selected PRB index and the selected SSB candidate. In some aspects of the present embodiments, a default multiplier value of "1" may be defined for the UE (e.g., through configuration or a set of rules) when the multiplier value corresponding to its service type is "null". For example, for the service type 470 (i.e., Access Category X), since the defined multiplier value 480 is "null", the derived prioritized BI value would be the "PRB index/SSB index-specific BI times 1".

In some aspects of the present embodiments, if the multiplier value corresponding to the service type of the UE is "infinity", the UE may not apply any prioritized BI derived from the tables 300 and 400. In some such embodiments, the UE may apply the initial (or unprioritized) BI value indicated in the RAR instead. For example, for the service type 450 (i.e., Access Category 3), since the defined multiplier value 460 is "null", the UE may not perform any derivation operation, and instead, may apply the BI value indicated in the RAR after the backoff period has expired.

Conversely, in some aspects of the present embodiments, if the multiplier value corresponding to the service type of the UE is "0", the UE may immediately transmit a new PRACH preamble to the base station (e.g., the derived prioritized BI is 0, thus the calculated backoff time based on the derived prioritized BI value is always 0). This is because when the multiplier value is "0", the derived prioritized BI value would be "PRB index/SSB index-specific BI times 0", which is "0". For example, for the service type 430 (i.e., Access Category 1), if the defined multiplier value 440 is "0", the UE may immediately transmit another PRACH preamble to the base station when the RA procedure fails.

As described above, a MAC subheader, as defined in the current NR agreement, may be modified in order to achieve a BI-based prioritization system for different SSB/BWP or SSB/PRB candidates. Therefore, the UE may have the knowledge of the specific BI that corresponds to the service type that the UE may select upon reception of the RAR. A mapping table between different multiplier values and different service types, as shown in table 400 above, may be included in the RACH-ConfigCommon IE field. This table, as discussed, may map the service types to the different BI multiplier values. After acquiring the table 400, the UE may save the multiplier value that corresponds to its service type, and may multiply the saved value by the SSB index/PRB index- or SSB index/BWP-specific BI, as indicated in the modified MAC subheader after receiving the modified MAC subheader.

Additionally, in some of the present embodiments, a unified "cell-level" BI value (e.g., unified for all SSB and BWP candidates or SSB and PRB candidates) may be signaled to the UEs (e.g., in a RACH-ConfigCommon IE from the RRC signaling). As described, when the multiplier value corresponding to the service type that the UE selects in table 400 is "null", the UE may apply a default multiplier value of "1", and therefore, the derived prioritized BI would be either "PRB index/SSB index-specific BI×1" or "BWP index/SSB index-specific BI×1". On the other hand, if the multiplier value is set to "infinity", the UE may not perform any prioritized BI derivation operation (e.g., based on the table 400 specified in the MAC subheader), and instead, may apply the unified "cell-level" BI value received from the base station.

Figure 5A:
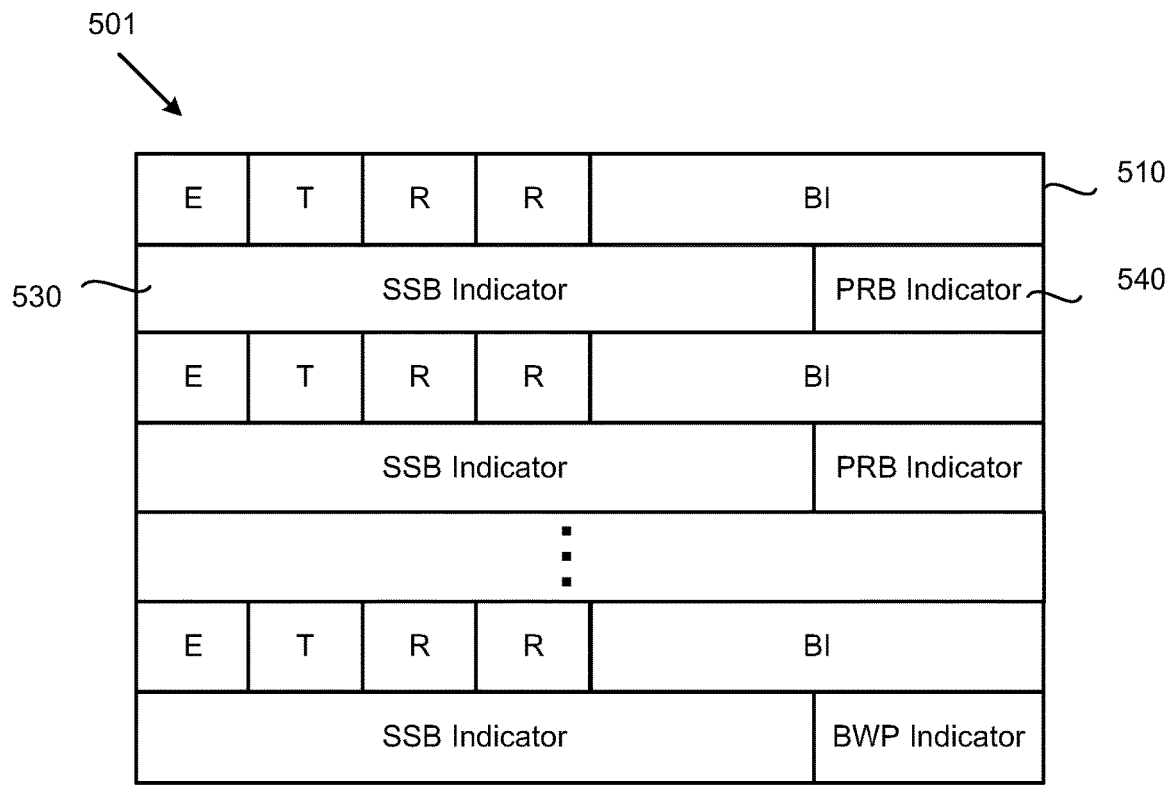
FIG. 5A illustrates a modified MAC subheader for BI prioritization of a contention-based RA procedure performed by a UE for both IDLE and CONNECTED states, according to an example implementation of the present application.
Figure 5B:
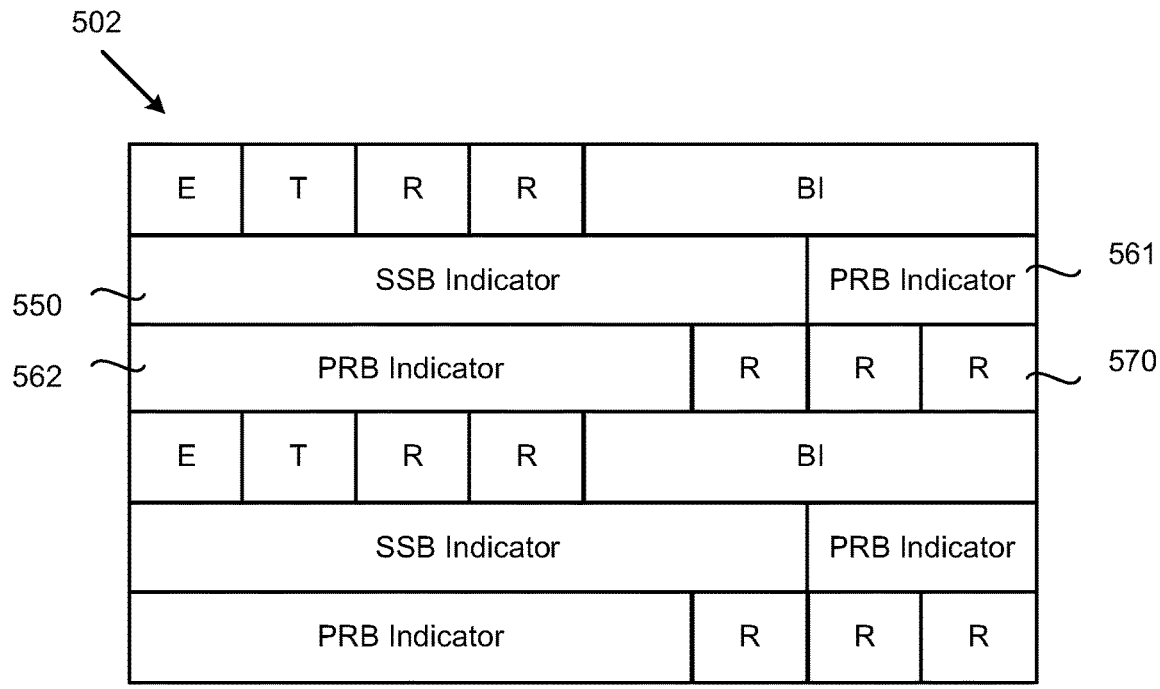
FIG. 5B illustrates a modified MAC subheader for BI prioritization of a contention-based RA procedure performed by a UE in a CONNECTED state, according to an example implementation of the present application.

In some of the present embodiments, depending on the state of the UE, the MAC subheader may be modified differently. FIG. 5A illustrates a modified MAC subheader for BI prioritization of a contention-based RA procedure performed by a UE for both IDLE and CONNECTED states, according to an example implementation of the present application. FIG. 5B illustrates a modified MAC subheader for BI prioritization of a contention-based RA procedure performed by a UE in a CONNECTED state, according to an example implementation of the present application.

As shown in FIG. 5A, the first octet 510 of the modified MAC subheader may include the current backoff indicator subheader defined for NR (e.g., the extension field, the reserved fields, the BI field, etc.). The second octet of the subheader, however, may include a 6-bit SSB indicator field and a 2-bit PRB/BWP index field. That is, the modified MAC subheader, in some of the present embodiments, may include the BI value of each SSB index/PRB index (e.g., for a UE that is in an IDLE state, or in a CONNECTED state), or the BI value of each SSB index/BWP index (e.g., for a UE that is in a CONNECTED state). As shown in FIG. 5A, the corresponding SSB identifier, PRB identifier, and/or BWP identifier are needed, so that both idle and connected UEs performing the CBRA procedures know which specific BI the UE should follow based on the selected SSB/PRB/BWP index. Since in current NR, a maximum of 64 SSBs is defined, an additional 6 bits (e.g., the SSB indicator 530) may be used for the identification of the SSB index. Consequently, the other 2 bits of the octet (e.g., the PRB/BWP indicator 540) may be used for the identification of either the PRB index, or the BWP index.

FIG. 5B illustrates a MAC subheader that is designed specifically for a UE in IDLE state performing a CBRA procedure. As shown in this figure, in some aspects of the present embodiments, a 6-bit field SSB indicator 550 (in the second octet), and a 7-bit field PRB-indicator 561-562 (in the second and third octets) are used in the modified MAC subheader to show the SSB indices and the PRB indices, respectively. This is because for 64 SSB indices, a maximum of 6 bits is required, and for a maximum of 100 PRB indices in 10 MHz band, a maximum of 7 bits is needed to identify the SSBs and the PRBs. The remaining three bits 570 in the third octet are the reserved bits in the modified MAC subheader.

The UE, in some of the present embodiments, may perform different methods in different embodiments when the UE does not successfully decode or receive the specific BI that corresponds to the SSB index and/or PRB index that the UE selects, or does not successfully decode or receive the specific BI that corresponds to the BWP index and/or SSB index that the UE selects.

In one aspect of the present embodiments, the UE may always set the BI value to "0", regardless of the received unified BI (and/or the received table 400) when the UE fails in decoding or receiving the BI. In another aspect of the present embodiments, when the UE has received a unified BI, the UE may always set the BI value to the stored unified BI (regardless of received table 400). Alternatively, when the UE has not received the unified BI, in some such embodiments, the UE may always set the BI value to "0". In yet another aspect of the present embodiments, when the UE has received a unified BI (and table 400), the UE may set the BI value to be the product of the unified BI and the BI multiplier corresponding to the service level of the unified BI. Alternatively, in some such embodiments, when the UE has not received the unified BI, but has received table 400, the UE may set the BI value to the unified BI value. Conversely, when the UE has not received the unified BI, but has received table 400, the UE may set the BI value to "0" in some of the present embodiments.

Figure 6:
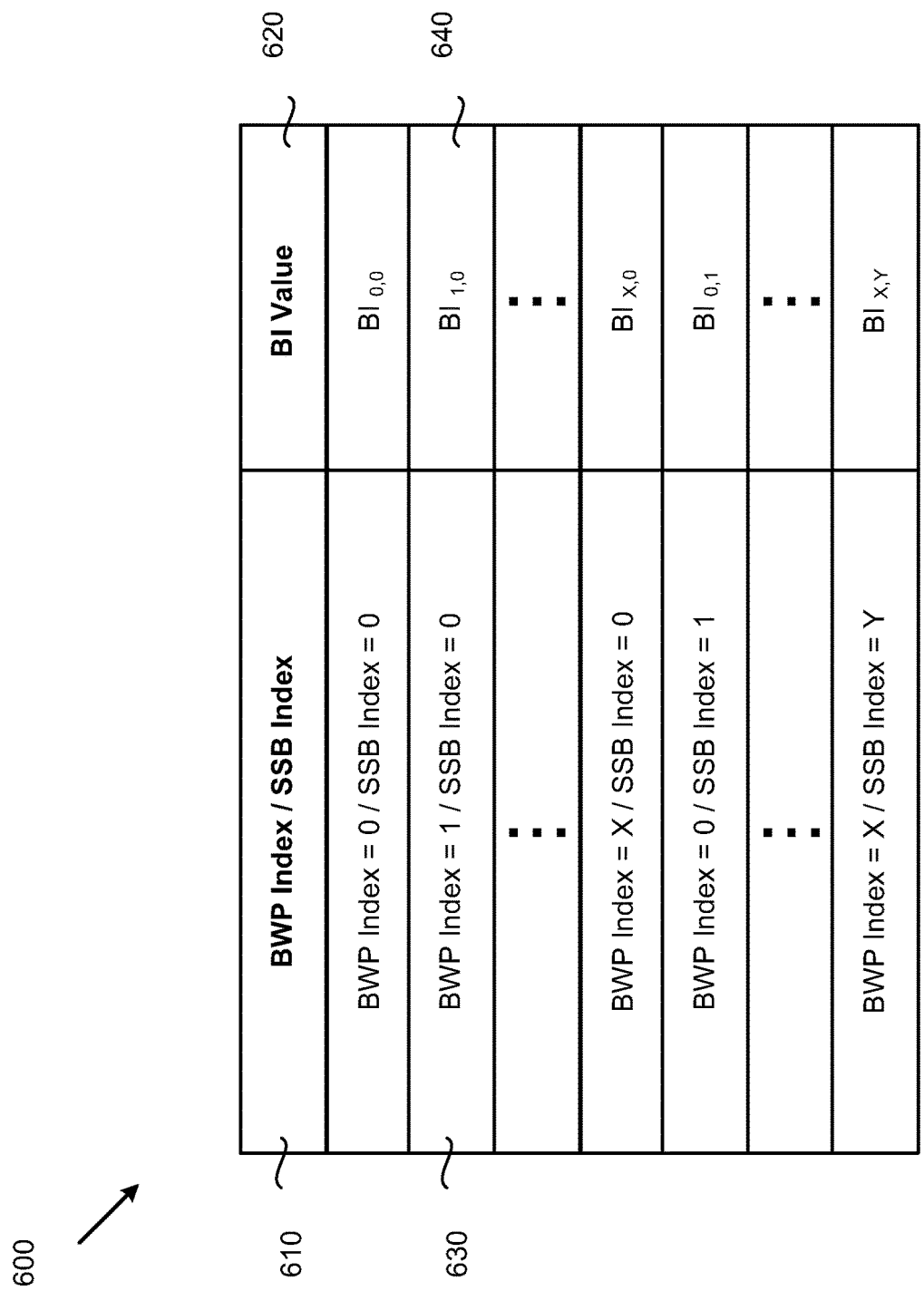
FIG. 6 illustrates a data structure that defines the mapping between the BI values and the corresponding BWP/SSB indices for a connected UE, according to an example implementation of the present application.

FIG. 6 illustrates a data structure (e.g., table 600) that defines the mapping between the BI values 620 and the corresponding BWP/SSB indices 610 for a connected UE, according to an example implementation of the present application. In some of the present embodiments, the base station may transmit the table 600 to the UEs using an RRC signaling (e.g., an RACH-ConfigDedicated IE field included in the RRC signaling). In some such embodiments, the base station may configure the table 600 specifically for the prioritization of the CBRA procedure for a UE having a CONNECTED state. For these embodiments, the assumption is that the current RAR structure in the current NR specification is used. As such, the mapping between SSB/BWP indices to BI values may be used to enable a connected UE to identify the BI that the UE needs to apply.

The mapping between the SSB index/BWP index to the BI value may be indicated (e.g., by the base station) in an RACH-ConfigDedicated IE in a dedicated Radio Resource Control (RRC) signaling. As such, the UE may apply the BI which corresponds to the BWP and SSB candidate that the UE selects if the UE needs to apply the CBRA procedure in a connected state. After obtaining the SSB/BWP index-specific BI table 600, some of the present embodiments may perform the prioritization method using a mapping table between the different multiplier values and the different service types (e.g., a mapping table, such as the mapping table 400, with reference to FIG. 4). This mapping table may be included in a RACH-ConfigDedicated IE via a dedicated RRC signaling transmitted by the base station. The table maps the service type (e.g., access category, Access Class (AC), event that triggers RA, QoS, etc.) to each BI multiplier. After acquiring the multiplier table, the UE may multiply the BI multiplier value to the SSB index/BWP index-specific BI value. By doing so, the UE may derive the prioritized BI value in some of the present embodiments.

In some of the present embodiments, the UE that successfully derives the prioritized BI value may then ignore the value received in the MAC subheader. Similar to what is discussed above, in some of the present embodiments, the UE may set a default BI multiplier value as "1" when the multiplier value corresponding to the UE's service type is "null". As such, the derived prioritized BI value may be "the BWP index/SSB index-specific BI×1". Alternatively, in some aspects of the present embodiments, if the multiplier value corresponding to the UE's service type is "infinity", the UE may not perform the derivation process (e.g., based on the mapping tables shown in FIGS. 4 and 6). In some such embodiments, the UE may apply the BI indicated in the MAC subheader instead.

Similar techniques, as discussed above, may be used to prioritize power ramping in some of the present embodiments. A PRACH power ramp step (or parameter) is the power increase step of the RA preambles for a UE that receives the acquisition indicator in an RA process. If the value of the power ramp step is too high, the access process may be shortened, while the probability of the power waste may be higher. Conversely, if the value of the power ramp step is too low, the access process may be lengthened, while the transmitting power may be saved. The base station may broadcast the initial transmission power level and the power step to the UE in a Broadcast CHannel (BCH). The UE may set the initial transmission power in the first preamble and wait for the UL grant on the PDCCH. If the UL grant is not acknowledged, the UE may increase the preamble transmission power by a specified power ramp step.

Based on the current NR specification, one power ramping step (i.e., powerRampingStep), unified in the entire cell may be indicated in an RACH-ConfigCommon IE field for idle state UE. On the other hand, one power ramping step (i.e., powerRampingStep) unified in a configured BWP may be indicated in a RACH-ConfigCommon IE field for connected state UE. However, power ramping steps that a UE may apply for preamble retransmission may vary at different SSBs and BWPs/PRBs for interference management purposes. Moreover, the power ramping step may also be varied for the UE for different priority levels in order to enable the power ramping step prioritization. As discussed above, the BWP and SSB switching may occur during an RA procedure. Thus, in some of the present embodiments, mapping between the specific power ramping steps and the SSBs/BWPs may be provided to the UEs (e.g., by the base station) for the UEs to apply the specific power ramping steps based on the SSBs/BWPs to which the UEs are required to switch. In addition, in some aspects of the present embodiments, a priority-level based power ramping step may be signaled to the UEs to achieve the power ramping prioritization.

FIG. 7 illustrates a data structure (e.g., table 700) that defines the mapping between the power ramping values 720 and the corresponding SSB/PRB indices 710, according to an example implementation of the present application. In some of the present embodiments, the base station may transmit the table 700 to the UEs using an RRC signaling (e.g., an RACH-ConfigCommon IE field included in the RRC signaling). Upon reception of the table 700, the UE may identify the power ramping value that corresponds to the PRB index and SSB index that the UE selects. In an example embodiment, if a power ramping value of "null" is associated with the PRB index/SSB index that the UE selects, the UE may apply the "cell-specific" powerRampingStep configured in an RACH-ConfigCommon IE field. On the other hand, if the power ramping value is not null, in some embodiments, the UE may ignore the "cell-specific" powerRampingStep configured in the RACH-ConfigCommon IE field. In the illustrated example of FIG. 7, if the UE selects an SSB that is associated with the PRB Index/SSB Index 730, the UE may apply the power ramping 740 (i.e., $dB_{1,0}$).

It should be noted that the base station, in some of the present embodiments, may use the PRB index (instead of the BWP index) for prioritizing the power ramping steps because during the initial access (e.g., the UE may be in an IDLE state), the UE still does not have the BWP configuration information (e.g., the BWP ID). Therefore, the PRB index may be used to implicitly indicate the different power ramping values that a UE may apply in different frequency domain locations.

In some aspects of the present embodiments, a UE may use the table 700 illustrated in FIG. 7, in conjunction with another mapping table illustrated in FIG. 8 to prioritize the different network services (e.g., access category, Access Class (AC), service type, event that triggers RA, QoS, etc.). FIG. 8 illustrates a data structure (e.g., mapping table 800) that defines the mapping between the power ramping multiplier values 820 and the corresponding service types 810, according to an example implementation of the present application. In some of the present embodiments, after obtaining the table 700 with reference to FIG. 7, the UE may use the mapping table 800 to realize the priorities of the different services.

In some of the present embodiments, the base station may use an RRC signaling (e.g., an RACH-ConfigCommon IE field included in the RRC signaling) to transmit the mapping table 800 to the UEs. After acquiring the mapping table 800, the UE, in some of the present embodiments, may multiply the power ramping multiplier 820 by the power ramping value 720 obtained from the table 700, and determine the prioritized power ramping value for the selected SSB/PRB index. In some aspects of the present embodiments, a default multiplier value of "1" may be defined for the UE (e.g., through configuration or a set of rules) when the multiplier value corresponding to its service type is "null". For example, for the service type 870 (i.e., Access Category X), since the defined power ramping multiplier value 880 is "null", the derived prioritized power ramping value would be the "PRB index/SSB index-specific power ramping value times 1".

In some aspects of the present embodiments, if the multiplier value corresponding to the service type of the UE is "infinity", the UE may not apply any prioritized power ramping derived from the tables 700 and 800. Instead, in some such embodiments, the UE may apply the cell-specific powerRampingStep configured in RACH-ConfigCommon IE. For example, for the service type 850 (i.e., Access Category 3), since the defined multiplier value 860 is "null", the UE may not perform any derivation operation, and instead, may apply the cell-specific powerRampingStep field.

Additionally, in some aspects of the present embodiments, an extra bit may be used along with each service type in the RACH-ConfigCommon. In some such embodiments, if "1" is indicated for the corresponding service type of the UE, the UE may always apply the maximum power ramping step. Alternatively, if "0" is indicated for the corresponding service type of the UE, the UE may apply the derived prioritized power ramping step value. For example, if the extra bit for the service type 830 (i.e., Access Category 1) indicates "1", the UE may apply the maximum power ramping step irrespective of the cell-specific value in the powerRampingStep field.

Figure 9:
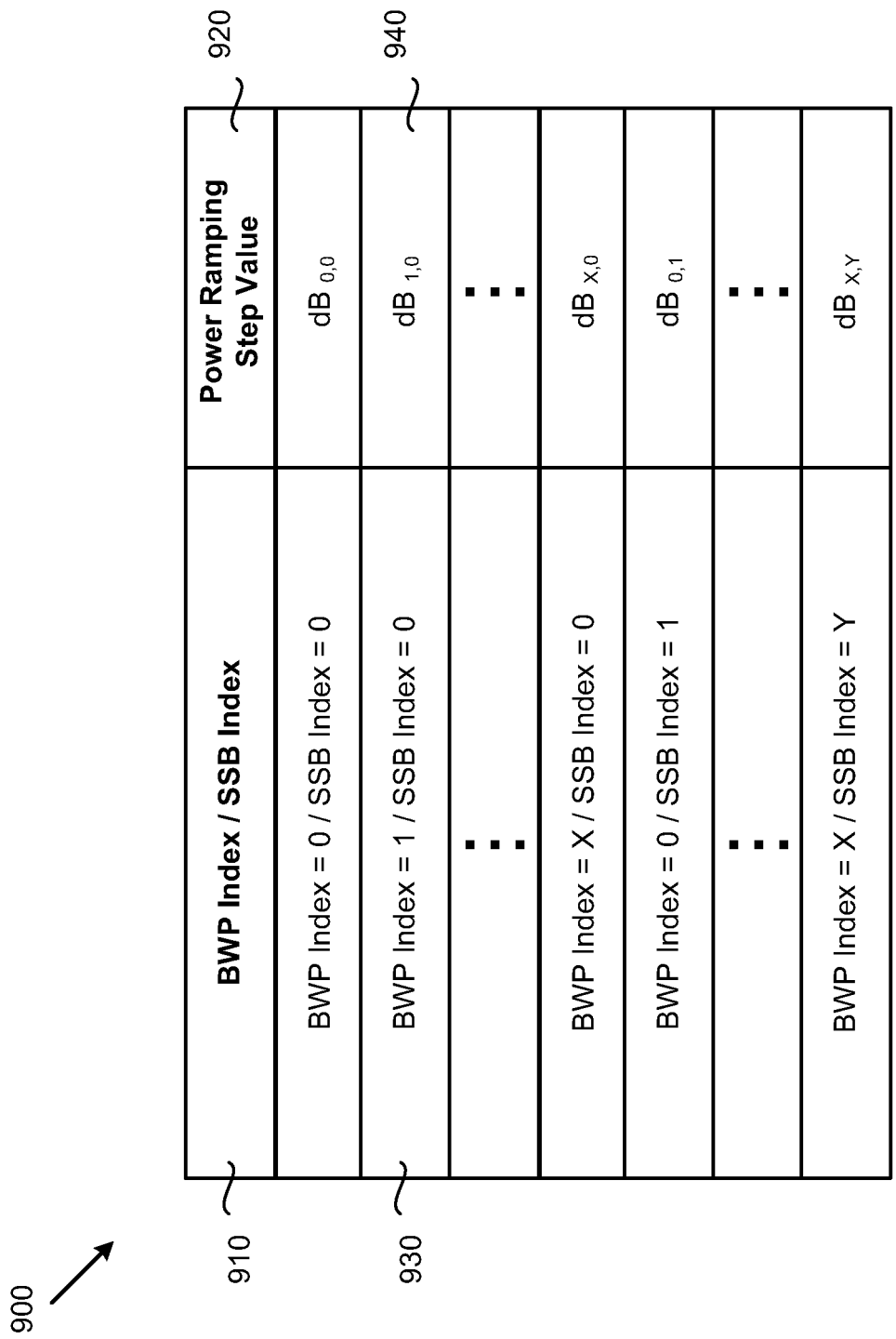
FIG. 9 illustrates a data structure that defines the mapping between the power ramping values and the corresponding BWP/SSB indices for a connected UE, according to an example implementation of the present application.

FIG. 9 illustrates a data structure (e.g., table 900) that defines the mapping between the power ramping values 920 and the corresponding BWP/SSB indices 910 for a connected UE, according to an example implementation of the present application. In some of the present embodiments, the base station may transmit the table 900 to the UEs using an RRC signaling (e.g., an RACH-ConfigDedicated IE field included in the RRC signaling). In some such embodiments, the base station may configure the table 900 specifically for the prioritization of the CBRA procedure for a UE having a CONNECTED state. The mapping between the SSB index/BWP index to the power ramping value may be indicated (e.g., by the base station) in an RACH-ConfigDedicated IE in a dedicated RRC signaling. As such, the UE may apply the power ramping which corresponds to the BWP and SSB indices that the UE selects if the UE needs to apply different power ramping steps. The UE, in some of the present embodiments, may ignore the cell-specific powerRampingStep configured in the RACH-ConfigCommon IE field if the table 900 is configured. Otherwise, in some aspects of the present embodiments, the UE may apply the cell-specific powerRampingStep value. Based on the illustrated example, when the UE selects the BWP/SSB indices 930 (i.e., the BWP index of "1" and the SSB index of "0"), the prioritization value for the power ramping would be the power ramping value 940 (i.e., $dB_{1,0}$).

After obtaining the SSB/BWP index-specific power ramping table 900, some of the present embodiments may perform the prioritization method using a mapping table between the different multiplier values and the different service types (e.g., a mapping table, such as the mapping table 800, with reference to FIG. 8). This mapping table may be included in a RACH-ConfigDedicated IE via a dedicated RRC signaling performed by the base station. The table maps the service type (e.g., access category, Access Class (AC), event that triggers RA, QoS, etc.) to each power ramping multiplier. After acquiring the multiplier table, the UE may multiply the power ramping multiplier value to the SSB index/BWP index-specific power ramping value. By doing so, the UE may derive the prioritized power ramping value in some of the present embodiments.

Similar to what is discussed above, in some of the present embodiments, the UE may set a default power ramping multiplier value as "1" when the multiplier value corresponding to the UE's service type is "null". As such, the derived prioritized power ramping value may be "the BWP index/SSB index-specific power ramping step×1". Alternatively, in some aspects of the present embodiments, if the multiplier value corresponding to the UE's service type is "infinity", the UE may not perform the derivation process (e.g., based on the mapping tables shown in FIGS. 8 and 9). In some such embodiments, the UE may apply the power ramping step indicated in the cell-specific powerRampingStep configured in the RACH-ConfigCommon IE field instead.

Additionally, in some aspects of the present embodiments, an extra bit may be used along with each service type in the RACH-ConfigDedicated. In some such embodiments, if "1" is indicated for the corresponding service type of the UE, the UE may always apply the maximum power ramping step. Alternatively, if "0" is indicated for the corresponding service type of the UE, the UE may apply the derived prioritized power ramping step value.

As discussed above, current specification of NR does not restrict beam and BWP switching during an RA procedure. As such, the RA prioritization may be performed by differentiating the subsequent UE actions at different priority levels for UE (e.g., when a beam or BWP switching is triggered during an RA procedure of the UE).

In some of the present embodiments, an "SSB accessibility" field may be indicated in the RACH-ConfigCommon IE field or the RACH-ConfigDedicated IE field. This field may include a single bit for indicating a limited access or an unlimited access assigned to each configured SSB index (hence a bitmap will be appended for indicating the limit/unlimited access for SSB indices accordingly). In some of the present embodiments, an SSB index with limited access (e.g., an SSB index to which "limited access" is assigned) may only be accessed by a UE that has "high priority". For example, if "limited access" is indicated for SSB 1, the base station of some of the present embodiments may allow a UE having a "high priority" to perform the RA procedure on the SSB 1.

In some such embodiments, two UEs that have different priority levels may have different SSB accessing capabilities. That is, even if a UE, during an RA procedure (or even before the RA procedure), finds several SSB candidates with acceptable SSB signal qualities, the UE may still need to verify whether the UE is allowed to access the SSB candidates, based on the "SSB prioritization" field and the "SSB accessibility" field assigned to the UE. In some of the present embodiments, the prioritization of the BIs and/or the power ramping steps for the UEs may be performed in conjunction with the different accessibility levels of the SSB candidates. For example, the UE may first check the UE's accessibility status to the SSB candidate (e.g., limited access or unlimited access), and then apply the BI/power ramping step accordingly. Some embodiments allow the combination of the aforementioned feature because even though an SSB may include its own RACH resource, there may be an excessive number of UEs attempting to perform the RA procedure on one SSB candidate. Therefore, the base station may limit the access of UEs with certain priority levels to some SSB candidates.

Additionally, as described above, in some of the present embodiments, the base station may use a table (e.g., included in RRC signaling, such as the RACH-ConfigCommon IE field or the RACH-ConfigDedicated IE field) to prioritize access to the network (e.g., by assigning high priority or low priority to different SSB candidates). In these embodiments, when a UE is in the backoff mode (i.e., waiting for the backoff time to expire) and the UE selects a high priority SSB candidate, i.e. configured in the RACH-ConfigDedicated, (e.g., when the physical layer of the UE detects a high priority SSB candidate), the UE may immediately select a configured RA preamble corresponding to the high priority SSB candidate for transmission without waiting for the expiration of the backoff time. Conversely, a UE that selects a low priority SSB candidate, i.e. configured in RACH-ConfigCommon, may wait for the backoff time to expire before selecting a new RA preamble for transmission to the base station.

Figure 10:
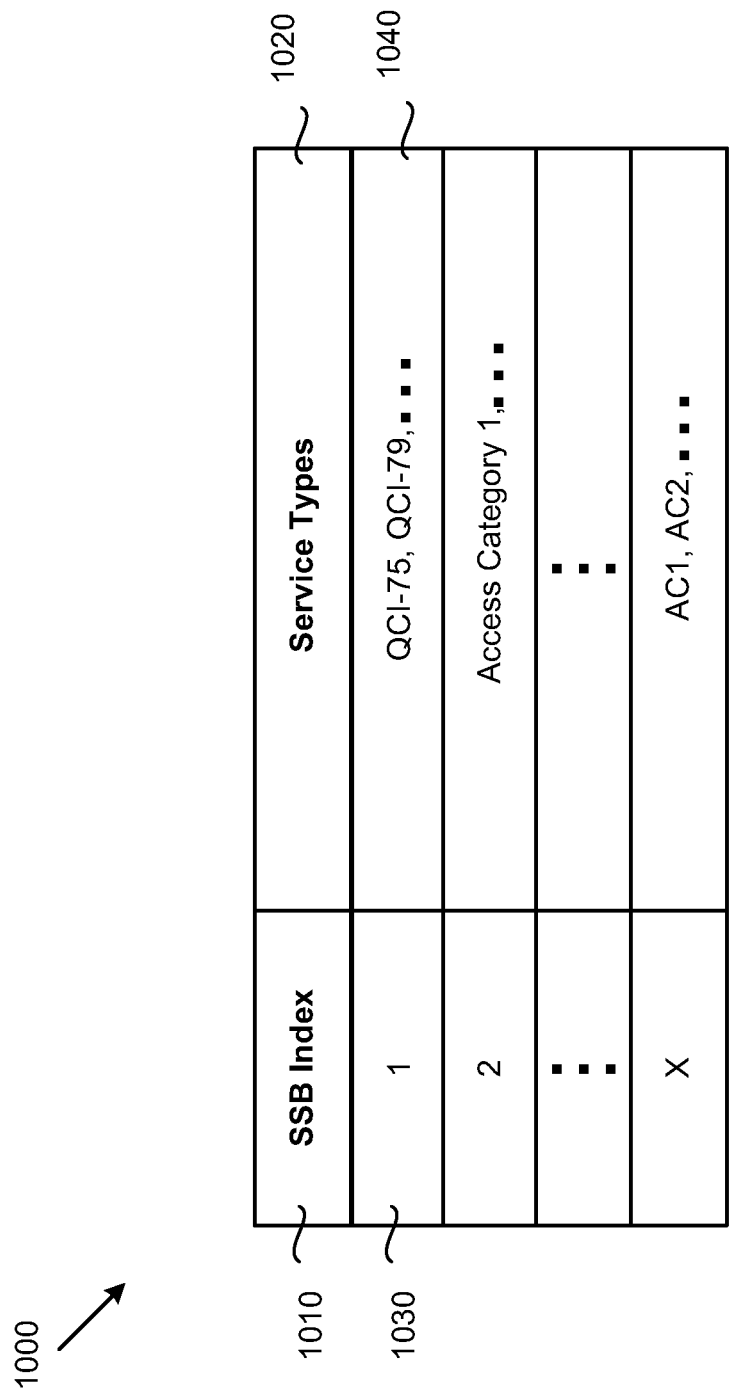
FIG. 10 illustrates a data structure that defines different service types that are assigned (or not assigned) to different SSB candidates, according to an example implementation of the present application.

Some of the present embodiments may provide an alternative method to enable accessibility of the SSBs by the UEs. FIG. 10 illustrates a data structure (e.g., table 1000) that defines different service types 1020 that are assigned (or not assigned) to different SSB candidates 1010, according to an example implementation of the present application. In some of the present embodiments, the table 1000 may be transmitted to a UE through an RRC signaling (e.g., in the RACH-ConfigDedicated IE field or in the RACH-Config-Common IE field included in the RRC signaling).

In some aspects of the present embodiments, the base station may indicate a complete list of allowed service types (e.g., access category, Access Class (AC), event that triggers RA, QoS, etc.) for each SSB index, as shown in FIG. 10. Alternatively, the UE may receive a complete list of banned service types for each SSB index through the table 1000 in some of the present embodiments. For example, the list of services allowed access to the SSB candidate with SSB index 1030 (i.e., SSB index 1) is the service list 1040 based on the data stored in table 1000.

Additionally, in some of the present embodiments, the base station (e.g., a gNB) may configure one or more BWPs for the UE when the UE enters into a connected state, where some of the BWPs may include one or more RACH resources. Moreover, a UE may perform BWP switching upon either RRC or PDCCH signaling received from the base station. The BWP switching is different than an SSB selection in which the UE has the capability to choose a suitable SSB candidate itself. In some of the present embodiments, when the UE's service type is indicated in the establishment clause in the RRC connection request message from the UE to the base station, the base station may make a better BWP assignment to the UE based on the UE's service type. That is, in some such embodiments, the base station has the knowledge of the priority level of each UE that is under its service. As such, the base station may assign a UE with certain priority levels, a specific BWP based on the BWP loading, RACH resource availability and/or other factors.

Figure 11:
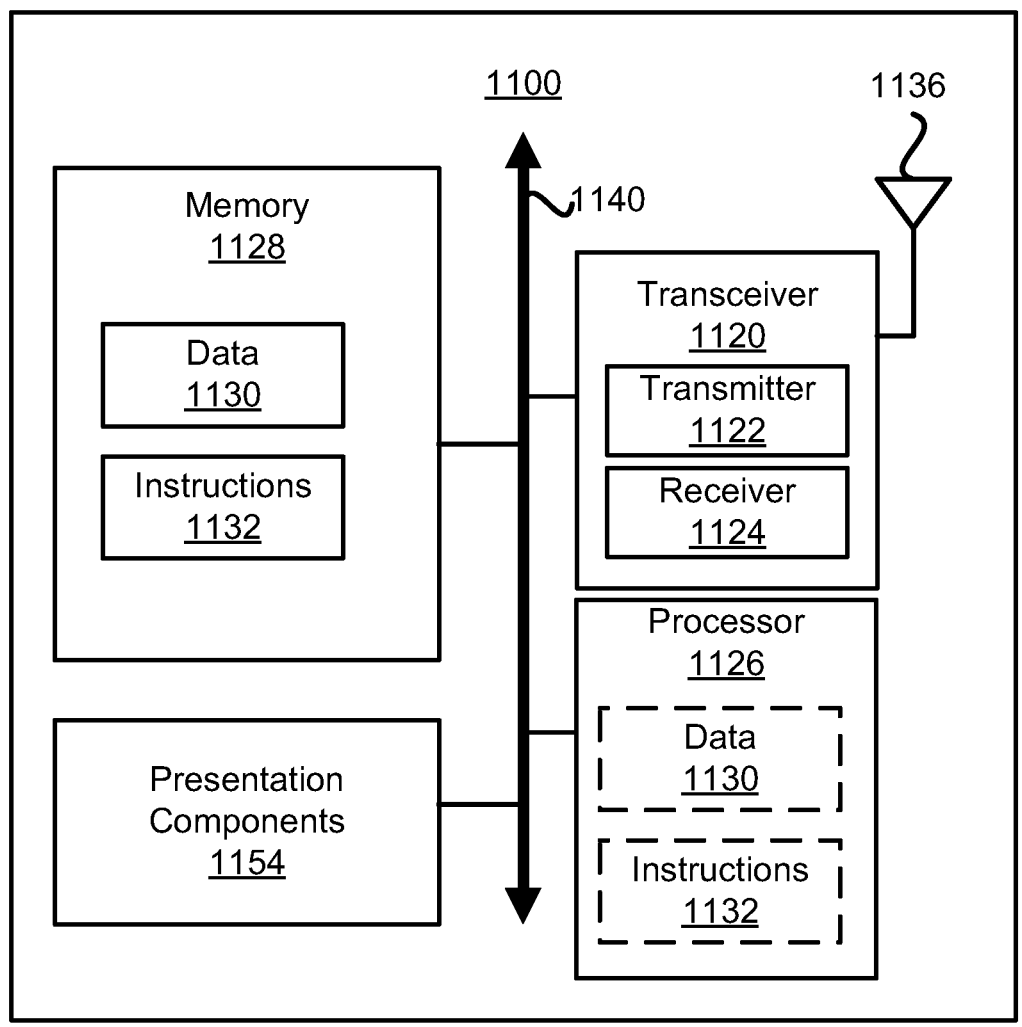
FIG. 11 illustrates a block diagram of a node for wireless communication, in accordance with various aspects of the present application.

FIG. 11 illustrates a block diagram of a node for wireless communication, in accordance with various aspects of the present application. As shown in FIG. 11, node 1100 may include transceiver 1120, processor 1126, memory 1128, one or more presentation components 1134, and at least one antenna 1136. Node 1100 may also include a Radio Frequency (RF) spectrum band module, a base station communications module, a network communications module, and a system communications management module, input/output (I/O) ports, I/O components, and power supply (not explicitly shown in FIG. 11). Each of these components may be in communication with each other, directly or indirectly, over one or more buses 1140.

Transceiver 1120 having transmitter 1122 and receiver 1124 may be configured to transmit and/or receive time and/or frequency resource partitioning information. In some implementations, transceiver 1120 may be configured to transmit in different types of subframes and slots including, but not limited to, usable, non-usable and flexibly usable subframes and slot formats. Transceiver 1120 may be configured to receive data and control channels.

Node 1100 may include a variety of computer-readable media. Computer-readable media can be any available media that can be accessed by node 1100 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1128 may include computer-storage media in the form of volatile and/or non-volatile memory. Memory 1128 may be removable, non-removable, or a combination thereof. Exemplary memory includes solid-state memory, hard drives, optical-disc drives, and etc. As illustrated in FIG. 11, memory 1128 may store computer-readable, computer-executable instructions 1132 (e.g., software codes) that are configured to, when executed, cause processor 1126 to perform various functions described herein, for example, with reference to FIGS. 1 through 10. Alternatively, instructions 1132 may not be directly executable by processor 1126 but be configured to cause node 1100 (e.g., when compiled and executed) to perform various functions described herein.

Processor 1126 may include an intelligent hardware device, e.g., a central processing unit (CPU), a microcontroller, an ASIC, and etc. Processor 1126 may include memory. Processor 1126 may process data 1130 and instructions 1132 received from memory 1128, and information through transceiver 1120, the base band communications module, and/or the network communications module. Processor 1126 may also process information to be sent to transceiver 1120 for transmission through antenna 1136, to the network communications module for transmission to a core network.

One or more presentation components 1134 presents data indications to a person or other device. Exemplary one or more presentation components 1134 include a display device, speaker, printing component, vibrating component, and etc.

Some implementations of the present application reduce the size of measurement report content or the number of measurement reports in response to the stored CHO command(s). As such, signaling overhead during CHO procedures can be reduced.

Some implementations of the present application allow a source base station (e.g., gNB) to inform one or more target base stations (e.g., gNBs) about the types of the wanted CHO based on different UE characteristics such that the target base stations may make the appropriate CHO command to the UE. As such, radio resource waste due to unused CHO commands may be reduced.

Some implementations of the present application allow a source base station to instruct a UE to execute one of the preconfigured CHOs since the source base station may have a better view (e.g., the whole picture) of the system condition, which may save negotiation time with target base stations via X2/Xn interface.

As the CHO procedure may be regarded as a UE-initiated network-configured procedure, to keep the network controllability, some implementations of the present application may allow a UE to execute a CHO command only when a corresponding triggering condition of the CHO command is fulfilled. The triggering condition of a CHO command may be configured by the network in some of the present embodiments. Moreover, even though a CHO command(s) is transmitted to the UE, some implementations of the present application may allow the network to maintain controllability of the final handover procedure, for example, by having the ability to trigger the conventional handover procedure, which supersedes or overwrites the UE-selected CHO procedure.

To increase the network controllability, according to some implementations of the present application, a UE may send a notification to inform the source base station of the triggered CHO command which is associated with a response timer. A triggered CHO command may be one of which the triggering condition of a CHO command is fulfilled. In one implementation of the present application, a new timer is utilized such that the source base station may have a period of time to decide to give permission to the execution of the triggered CHO command, to transmit a new handover command, or to refuse the execution of the triggered CHO command. In one implementation of the present application, if the UE does not receive a response from the source base station before the timer is expired, the UE may determine that the serving cell quality has dropped rapidly such that no response could be received. In such a case, the UE may directly execute the triggered CHO command. In another implementation of the present application, a UE may send a notification to the source base station and directly perform the triggered CHO command without asking for permission, or waiting for a response, from the source base station.

According to some implementations of the present application, a selection mechanism among multiple triggered CHO commands is utilized to avoid unpredictable UE behaviors, where according to the selection mechanism, the handover procedures corresponding to the triggered CHO commands may be prioritized.

According to some implementations of the present application, a notification may be sent from a UE to a source base station to inform the base station of an execution of a CHO command to improve network performance.

According to some implementations of the present application, a mechanism for selecting a CHO failure response may be disclosed to reduce the unpredictability of the UE behaviors.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for a random access (RA) procedure performed by a user equipment (UE) having a specific access identity value, the method comprising:
   receiving a mapping table via radio resource control (RRC) signaling from a base station, the mapping table including one or more access identity values and one or more backoff multipliers corresponding to the one or more access identity values;
   transmitting a first RA preamble of the RA procedure to the base station;
   receiving a random access response (RAR) in response to the first RA preamble from the base station, the RAR including a backoff value;
   setting a resultant backoff value by multiplying the backoff value by a specific backoff multiplier corresponding to the specific access identity value of the UE in a case that the specific access identity value of the UE is included in the mapping table and an indication corresponding to the specific access identity value of the UE is not a specific value;
   setting the resultant backoff value to the backoff value in a case that the specific access identity value of the UE is not included in the mapping table; and
   transmitting a second RA preamble of the RA procedure to the base station after a duration indicated by the resultant backoff value expires.

2. The method of claim 1, wherein each of the one or more access identity values is one of an access category value, an access class value, and a slice identity value.

3. The method of claim 1, wherein the mapping table is included in a RACH- ConfigCommon Information Element (IE) in the RRC signaling.

4. The method of claim 1, further comprising:
   setting the resultant backoff value to the backoff value in a case that the specific access identity value of the UE is included in the mapping table and the indication is the specific value.

5. A user equipment (UE) having a specific access identity value, the UE comprising:
   one or more non-transitory computer-readable media having computer-executable instructions embodied thereon; and
   at least one processor coupled to the one or more non-transitory computer-readable media, and configured to execute the computer-executable instructions to:
   receive a mapping table via radio resource control (RRC) signaling from a base station, the mapping table including one or more access identity values and one or more backoff multipliers corresponding to the one or more access identity values;
   transmit a first random access (RA) preamble of the RA procedure to the base station;
   receive a random access response (RAR) in response to the first RA preamble from the base station, the RAR including a backoff value;
   set a resultant backoff value by multiplying the backoff value by a specific backoff multiplier corresponding to the specific access identity value of the UE in a case that the specific access identity value of the UE is included in the mapping table and an indication corresponding to the specific access identity value of the UE is not a specific value;
   set the resultant backoff value to the backoff value in a case that the specific access identity value of the UE is not included in the mapping table; and
   transmit a second RA preamble of the RA procedure to the base station after a duration indicated by the resultant backoff value expires.

6. The UE of claim 5, wherein each of the one or more access identity values is one of an access category value, an access class value, and a slice identity value.

7. The UE of claim 5, wherein the mapping table is included in a RACH-ConfigCommon Information Element (IE) in the RRC signaling.

8. The UE of claim 5, wherein the at least one processor is further configured to execute the computer-executable instructions to set the resultant backoff value to the backoff value in a case that the specific access identity value of the UE is included in the mapping table and the indication is the specific value.

9. A method for a random access (RA) procedure performed by a base station, the method comprising:
   transmitting a mapping table via radio resource control (RRC) signaling to a user equipment (UE) with a specific access identity value, the mapping table including one or more access identity values and one or more backoff multipliers corresponding to the one or more access identity values;
   receiving a first RA preamble of the RA procedure from the UE;
   transmitting a random access response (RAR) in response to the first RA preamble to the UE, the RAR including a backoff value; and
   receiving a second RA preamble of the RA procedure from the UE, wherein:
   a time interval between the first RA preamble and the second RA preamble is associated with a product of the backoff value and a specific backoff multiplier corresponding to the specific access identity value of the UE in a case that the specific access identity value of the UE is included in the mapping table and an indication corresponding to the specific access identity value of the UE is not a specific value, and
   the time interval between the first RA preamble and the second RA preamble is associated with the backoff value in a case that the specific access identity value of the UE is not included in the mapping table.

10. The method of claim 9, wherein each of the one or more access identity values is one of an access category value, an access class value, and a slice identity value.

11. The method of claim 10, wherein the mapping table is included in a RACH-ConfigCommon Information Element (IE) in the RRC signaling.

12. The method of claim 9, wherein the time interval between the first RA preamble and the second RA preamble is associated with the backoff value in a case that the specific access identity value of the UE is included in the mapping table and the indication is the specific value.

* * * * *